(12) United States Patent
Sukthankar et al.

(10) Patent No.: US 6,704,447 B2
(45) Date of Patent: Mar. 9, 2004

(54) METHOD AND APPARATUS FOR USING ILLUMINATION FROM A DISPLAY FOR COMPUTER VISION BASED USER INTERFACES AND BIOMETRIC AUTHENTICATION

(75) Inventors: Rahul Sukthankar, Cambridge, MA (US); Richard Caruana, Pittsburgh, PA (US); Matthew Mullin, Pittsburgh, PA (US); Keiko Hasegawa, Tokyo (JP)

(73) Assignee: Justsystem Corporation, Tokushima (JP)

( * ) Notice: Subject to any disclaimer, the term of this patent is extended or adjusted under 35 U.S.C. 154(b) by 203 days.

(21) Appl. No.: 09/790,350

(22) Filed: Feb. 21, 2001

(65) Prior Publication Data

US 2002/0146169 A1 Oct. 10, 2002

(51) Int. Cl.[7] .................................................. G06K 9/00
(52) U.S. Cl. ........................ 382/170; 382/106; 382/115; 382/173
(58) Field of Search .................................. 382/170, 168, 382/171, 173, 106, 103, 115–118; 348/602, 586, 14.01–14.16; 700/83; 345/863, 864–866, 850, 156–158, 7–9; 463/30–36, 25; 35/3.01–3.03, 400

(56) References Cited

U.S. PATENT DOCUMENTS

| | | | | |
|---|---|---|---|---|
| 4,436,418 | A | | 3/1984 | Morino ...................... 356/3.05 |
| 4,579,450 | A | | 4/1986 | Nagaoka et al. ........... 356/3.05 |
| 4,830,498 | A | | 5/1989 | Nishimoto et al. ......... 356/3.05 |
| 5,541,723 | A | | 7/1996 | Tanaka ...................... 356/3.01 |
| 5,617,312 | A | * | 4/1997 | Iura et al. ..................... 700/83 |
| 5,854,661 | A | | 12/1998 | Kochanski .................. 348/602 |
| 5,923,380 | A | | 7/1999 | Yang et al. ................. 348/586 |
| 5,923,773 | A | | 7/1999 | Oshima ...................... 382/154 |
| 6,181,343 | B1 | * | 1/2001 | Lyons ......................... 345/850 |
| 6,184,847 | B1 | * | 2/2001 | Fateh et al. ..................... 345/8 |
| 6,283,860 | B1 | * | 9/2001 | Lyons et al. ................. 463/36 |

2002/0128060 A1 * 9/2002 Belhumeur et al. ........... 463/25

OTHER PUBLICATIONS

Georghiades et al., Illumination based image synthesis: creating novel images of human faces under differing pose and lightin Jun. 1999, IEEE INSPEC Accession No. 6319884, 47–54.*

Raskar et al., The Office of the Future: A Unified Approach to Image–Based Modeling and Spatially Immersive Displays, Jul. 1998, ACM SIGGRAPH 98, 1–10.*

Ramesh Raskar, Greg Welch, Matt Cutts, Adam Lake, Lev Stesin and Henry Fuchs, "The Office of the Future: A Unified Approach to Image–Based Modeling and Spatially Immersive Displays", Computer Graphics Proceedings, Annual Conference Series, pp. 10, Jul. 19–24, 1998.

H. Tagare et al.; "Simultaneous Estimation of Shape and Reflectance Map from Photometric Stereo"; 1992, pp. 275–286.

M. Turk; "Fast head tracking and applications"; Oct. 1996; http://www.research.microsoft.com/users/mturk/draping.htm.

* cited by examiner

*Primary Examiner*—Leo Boudreau
*Assistant Examiner*—Ishrat Sherali
(74) *Attorney, Agent, or Firm*—Webb Ziesenheim Logsdon Orkin & Hanson, P.C.

(57) ABSTRACT

Disclosed is a computer-assisted method for analyzing the surroundings of a display device. At least two different patterns are displayed successively on a display device connected to a computer. A camera is also connected to the computer and is directed towards objects in front of the display device. Each time a pattern is displayed on the display device, at least one image of the surroundings is captured. The captured images are combined to create a difference image. The difference image is analyzed to interpret the objects in the surroundings. For example, calculations may be performed to segment the foreground from the background of the surroundings or to estimate the range (distance) of the objects from the display device. An apparatus for performing this computer-assisted method is also disclosed.

20 Claims, 6 Drawing Sheets

METHOD AND APPARATUS FOR USING ILLUMINATION FROM A DISPLAY FOR COMPUTER VISION BASED USER INTERFACES AND BIOMETRIC AUTHENTICATION

BACKGROUND OF THE INVENTION

1. Field of the Invention

This invention relates to a computer-assisted reflectance-based object detection system and, more specifically, to a detection system having a display device as a light source.

2. Background

Reflectance-based object detection devices are currently known. The reflectance channel from a laser rangefinder is used to detect small obstacles on a highway. Photometric stereo recovers depth information by illuminating a scene from a variety of controlled directions.

Computer monitors, in addition to being display devices, can also serve as illumination sources, for example, for computer vision applications. However, the main limitation to using a monitor as a programmable illumination source is that monitor brightness is typically low compared with ambient illumination. Thus, differences in the brightness of the surroundings due to changes in the monitor's illumination can be small. The precision with which depth information can be recovered, therefore, is restricted.

SUMMARY OF THE INVENTION

It is an object of the present invention to provide a method and apparatus for analyzing the differences in the brightness of a computer's surroundings using a display device as a light source.

Accordingly, we have developed a method and apparatus to accurately detect the differences in scene brightness due to changes in a display device's illumination by accumulating information from a sequence of images.

A display device may be any display device, for example, a computer monitor, a CRT display, or a backlit LCD display. Thus, throughout the specification and the claims, the words display device and monitor are used interchangeably.

The present invention includes a computer having a processor. A display device is connected to the computer. The processor causes at least two different patterns to be displayed successively on the display device. A camera is connected to the computer and is directed towards objects in front of the display device. The processor controls the camera such that each time a pattern is displayed on the display device at least one image of the surroundings is captured. The captured images are aligned and differ substantially only in scene illumination. The processor combines the captured images to create a difference image. The difference image is analyzed to interpret the objects in the surroundings. For example, calculations may be performed to segment the foreground from the background of the surroundings or to estimate the range (distance) of at least one object from the display device.

DESCRIPTION OF THE PREFERRED EMBODIMENTS

Figure 1:
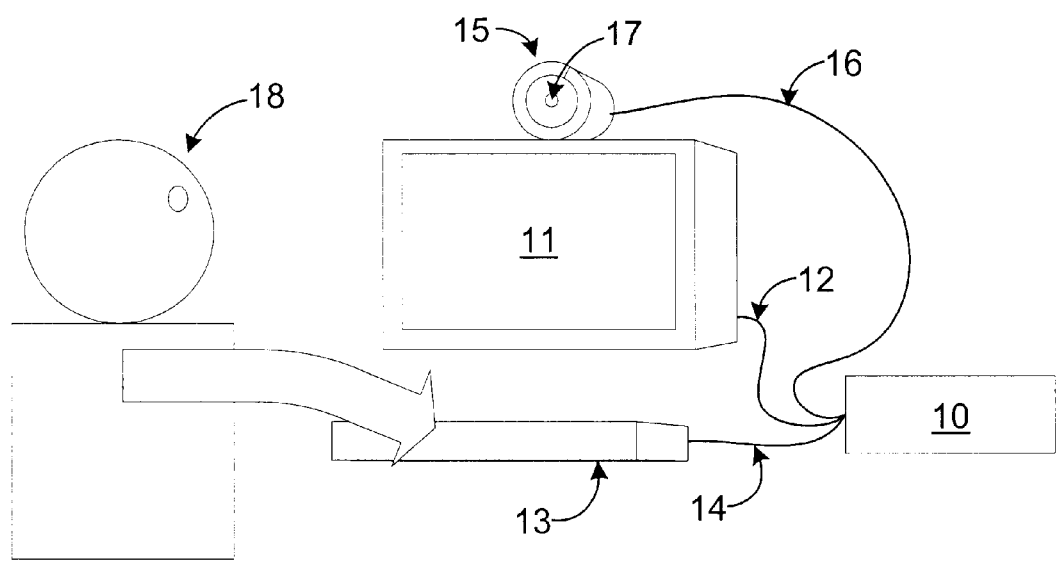
FIG. 1 is a schematic illustration of an apparatus according to the present invention.

Computer monitors, in addition to being display devices, can also serve as illumination sources. A monitor with 1280×1024 pixels can be treated as 1,310,720 independent light sources arranged in a rectangular grid, each of which can be turned on, turned off, or changed in hue and intensity. This provides a flexible, programmable source of illumination. The effects of this illumination on objects near the monitor can be detected and exploited to significantly enhance reflectance-based, or vision-based, applications.

The intensity of the illumination from the monitor falls off with distance and is affected by the position of the pixel in a two dimensional grid. Monitor illumination, therefore, can be used to measure object distance and recover scene depth. However, the main limitation to using a monitor as a programmable illumination source for computer vision applications is that monitor brightness typically is low compared with ambient illumination. Differences in scene brightness due to changes in the monitor illuminant can be small, and this restricts the precision with which depth information can be recovered.

An apparatus of the present invention includes a computer including at least a display device and a processor. A camera, such as a digital camera, sits near or on top of the display device and is directed towards a user or objects in the room. The processor controls both the display device and the camera and performs all computations. The processor is programmed to execute the methods described below.

In a method of the present invention, at least two patterns are successively shown on a display device. The patterns are selected to optimize the differences in the environmental illumination conditions. A camera captures an image for each of the patterns shown. The captured images differ substantially only in scene illumination. The images may be filtered temporally and/or spatially to reduce noise introduced during image acquisition. At least one difference image is created from the aligned captured images by combining, preferably subtracting, images taken under one illumination condition from images taken under a different illumination condition. The difference image may be filtered to reduce noise introduced in the combining step and to smooth the image. The difference image is analyzed in an application-dependent manner, for example, for foreground/background separation and/or range estimation.

Although the lights may be on and light may enter the scene from other sources, such as windows and doors, illumination from the display device on objects that are less than about 1–2 meters from the display device is detected. Typically, the normal room lighting is many times brighter than the illumination from the display device. However, it is possible to detect the display device's illumination by careful processing of sequences of images taken with and without the display device illuminant.

In a foreground/background separation application, the goal is to identify the objects in the foreground of a scene.

Since the intensity of incident illumination falls off rapidly with distance from the source, objects in the background receive little light from the display device and are, thus, muted in the difference image. Conversely, objects in the foreground, such as a user's face, are brightly illuminated and their appearance is accentuated. Under the assumption that the user's face is a good reflector (high albedo and oriented normal to the display device), then by simply thresholding the difference image, the user can be separated from the background. The difference image is used to create a binary mask that can be applied to the image captured by the camera. Each mask segments out only those objects whose distance from the apparatus falls within a specified range. In many applications, only two depth ranges are required: the foreground that contains the objects of interest (for example, the user's face) and the background that contains distracting objects. Actual distances are not required.

For example, given a grayscale camera mounted on a computer monitor, the goal is to segment the user's face from his surroundings. Using the present invention, the computer monitor's screen is flashed rapidly, for example, in a repeated pattern of dark screens and light screens, and a sequence of images is acquired (an image is captured during each bright and each dark period). This synchronization is straightforward since both the illumination and the image acquisition are under the same application's control. Given the images taken under bright and dark conditions, the dark images are subtracted from the sum of the bright images creating a difference image. A more robust difference image may be obtained using median filters. In the difference image, the effect of the ambient illumination (e.g., office lighting, sunlight, etc.) has been removed, leaving an image of the scene as it would appear solely under the monitor's glow.

In the example above, the display device was used simply as a single light source (all of the pixels were illuminated in unison). However, by illuminating pixels in more complex patterns, the display device can be used for photometric stereo or for range estimation. For photometric stereo, by alternately illuminating the left and right halves of the screen, one can create a difference image that highlights the shape of an object in the foreground. This idea is more difficult because: 1) unless the objects are quite close to the display device, the difference in intensity from different pixels is extremely small; and 2) since the effects are subtle, the measurements are very noisy, thus creating a depth map from these images is non-trivial.

For range estimation, the goal is to create a depth map. In range estimation, a range, surface orientation, and albedo for a surface patch in the scene corresponding to each pixel in the image are estimated. Modifying the example above, the computer monitor's screen is flashed rapidly, for example, in a repeated pattern of dark screens and patterned screens. The dark images are subtracted from the sum of the patterned images creating one or more difference images. For each pixel of the difference image or a portion of the difference image, at a selection of ranges, the method tests whether a hypothesized surface at that point in space (with some orientation and albedo) could have produced the measured illuminations in the difference image. The range that minimizes the error between the predicted and measured intensities is used as the range estimate for that pixel, resulting in a distance image for the difference image or portion thereof. The distance image may then be divided into objects based on the distances for each pixel. For example, if there is a contiguous region in the distance image which is two feet from the camera and the rest of the distance image is ten feet away, then the contiguous region most likely corresponds to a distinct object. Other information may be used along with the distances to identify objects in the scene.

The present invention may be used in the following applications:

A laptop computer equipped with a small camera may be used to fax documents. A user holds the document up to the camera while the screen flashes. The document in the user's hand is then extracted from the background, image-warped to a rectangular shape, and faxed.

When a computer workstation is left unattended, the computer may automatically lock itself and display a screensaver that varies the color hues and light levels in the scene. When the user returns to the workstation, his identity is confirmed by a face recognition system. The appearance of the person varies with the light of the screensaver in a manner that is known to the security application. Thus, the system confirms that the image being processed was acquired at the right time (based on the screen saver hues) and belonged to a person rather than a flat photograph (based upon a crude depth-map).

A workstation equipped with a camera may create a depth map of a static scene by accumulating data over a long time period. The very subtle effect of the display device's light on distant objects becomes perceptible over thousands of observations. Thus, unattended office workstations could be used to create maps of their environments.

A computer user may create three-dimensional models of an object by holding it up to a desktop camera while a nearby display device provided different illumination conditions.

Referring now to the Figures, FIG. 1 illustrates an apparatus of the present invention having a computer 10 including at least a display device 11 and a processor (within the computer). The display device 11 is connected to the computer 10 by display device line 12. A keyboard 13 may be connected to computer 10 by keyboard line 14. A camera 15 is connected by camera line 16 to the computer 10. An aperture 17 of the camera 15 is directed to the surroundings of the computer 10 in the same general direction as that of the display device 11. For example, the camera 15 in FIG. 1 is aimed at a user 18. The processor in the computer 10 controls the display device 11 and the camera 15. The processor is programmed to execute the methods of the invention described below.

Figure 2:
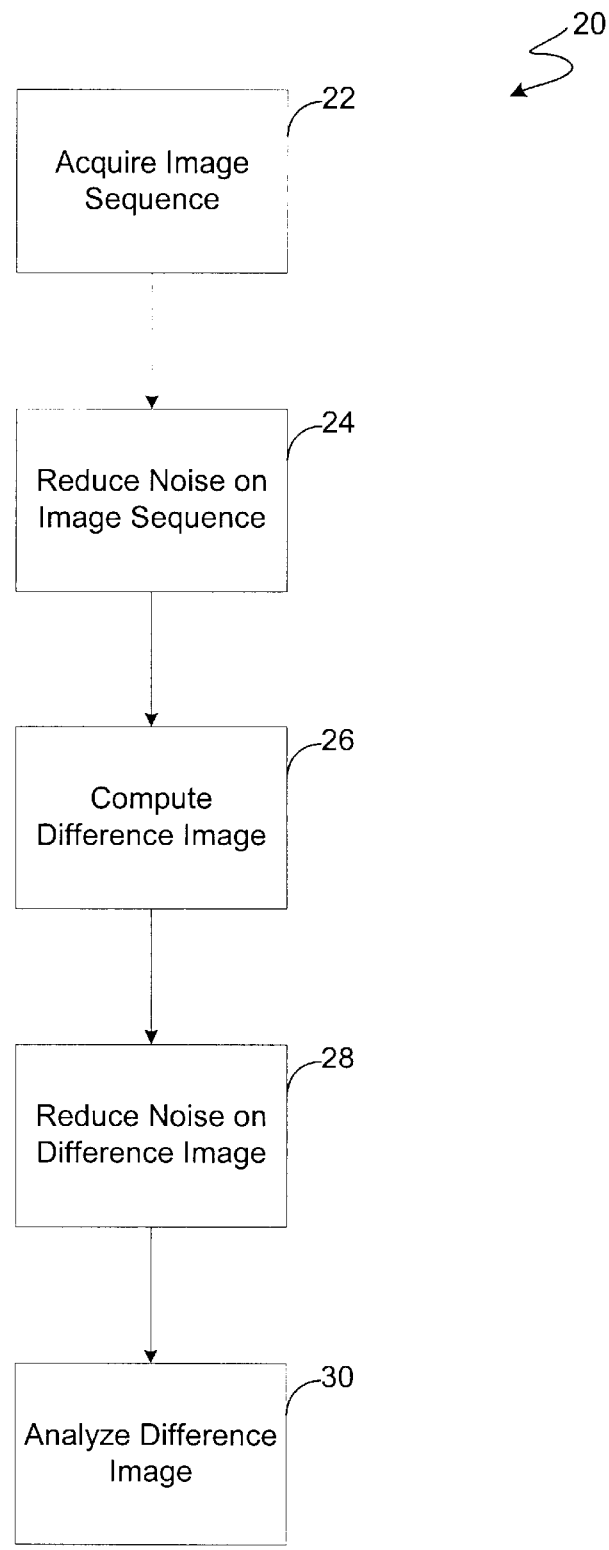
FIG. 2 is a schematic illustration of a method according to the present invention.
Figure 3A:
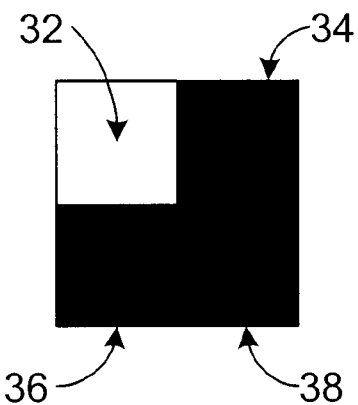
FIGS. 3A–3D are illustrations of patterns having one quadrant illuminated.
Figure 3B:
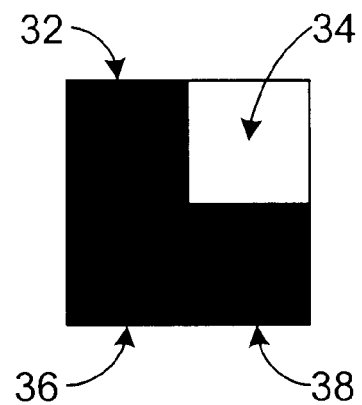
Figure 3C:
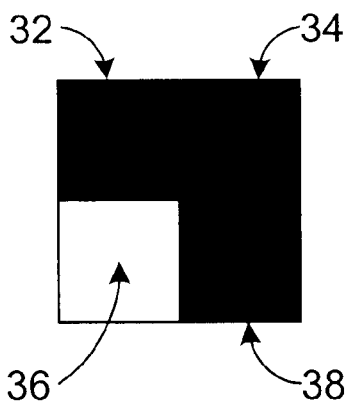
Figure 3D:
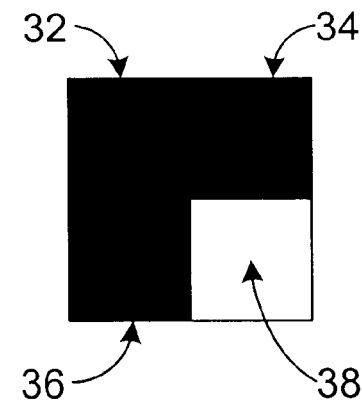
Figure 4A:
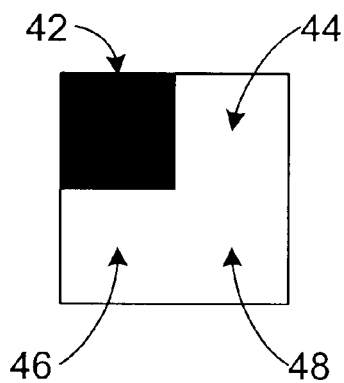
FIGS. 4A–4D are illustrations of patterns having three quadrants illuminated.
Figure 4B:
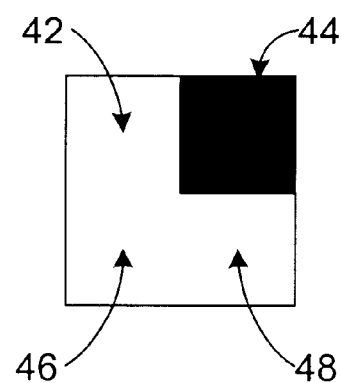
Figure 4C:
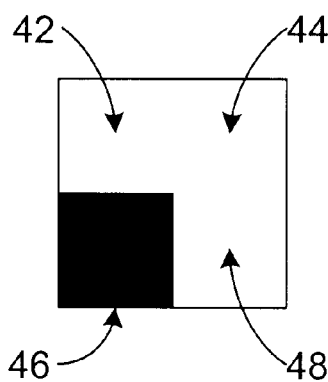
Figure 4D:
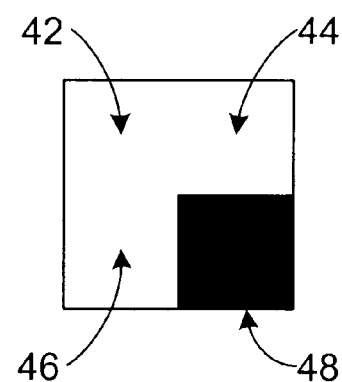

Referring to FIG. 2, a method 20 analyzes the surroundings of a computer 10. A first step 22 of the method 20 according to the present invention is to acquire an image sequence. At least two patterns are shown on the display device 11. Using the camera 15, at least one image is captured when each pattern is displayed. The images captured differ substantially only in scene illumination. Preferably, more than one image is captured for each pattern, thereby creating a sequence of images for each pattern. The camera 15 and the display device 11 are both controlled by the processor in the computer 10. Thus, synchronization of the patterns on the display device 11 and the activation of the camera 15 is controlled. Step 24 may be used to reduce noise in the captured sequences of images from step 22. In step 26, at least one difference image is computed by combining the sequences of images captured in step 22. Step 28 may be used to reduce noise introduced in the at least one difference image from step 26. The at least one difference image is then analyzed in step 30 in an application-dependent manner, for example, for foreground/background segmentation and/or for range estimation.

In a preferred method 20 applied to foreground/background segmentation, step 22 utilizes two patterns of illumination: a white screen (fully illuminated or maximum brightness) and a dark screen (unilluminated or maximum darkness). These two patterns are shown successively. The successive patterns are also repeated (i.e., a white screen, then a dark screen, then a white screen, then a dark screen, and so on). Thus, two sequences of images are acquired, one for the white screen and one for the dark screen. Multiple images are acquired to minimize the effect of transient illumination conditions in the environment. Also, alternating images taken under bright and dark conditions reduces the effect of any changes in the surroundings (i.e., light variations from windows or doors, the flicker of fluorescent lights, etc.).

Step 24 may employ one of several methods to reduce noise in the input images, such as temporal or spatial filtering. In temporal filtering, the set of images acquired under the same illumination pattern may be averaged, for example, using an arithmetic mean or median operators, on a pixel-by-pixel basis to create a single image for that pattern. The result is a bright image and a dark image. In spatial filtering, noisy pixels in a given input image may be eliminated by averaging pixel values with neighboring pixels using a smoothing filter such as a Gaussian filter or despeckled using a spatial median operator.

Step 26 subtracts the dark image from the bright image on a pixel-by-pixel basis to create a difference image. Pixel values of the difference image correspond to the light reflected from the display device back to the camera. High values correspond to the light reflected from the display device back to the camera. High values are therefore associated with high albedo (white colored objects) or proximity to the display device. Taking the pixel-by-pixel difference between the dark and the bright images yields a difference image that is very sensitive to the small changes in scene illumination due to the display device. The constant illumination from background sources tends to cancel, whereas the changes due to the display device are reinforced.

The difference image computed in step 26 may contain occasional noisy pixels (e.g., caused by specular reflections in the scene, sudden changes in background illumination, or moving objects in the scene). Therefore, in step 28 filters may be applied to reduce the noise, for example, a 3×3 spatial median filter.

With the clean difference image resulting from step 28, step 30 creates a binary mask that separates objects in the foreground from the background clutter. This step may be accomplished using a dynamic thresholding technique. Each pixel value of the difference image is assumed to roughly correspond to the proximity of the object from the apparatus. Therefore, by selecting an appropriate threshold value in the difference image, any objects that are farther than the foreground objects can be masked. First, a histogram of the intensities in the difference image is computed. Next, the histogram may be smoothed using a Gaussian convolution to remove small local minima. The threshold is heuristically assigned to the intensity value corresponding to the deepest local minimum in the histogram. A binary mask is created by assigning a 1 to any pixel in the difference image that exceeds the threshold, and 0 otherwise. The binary mask thus separates the foreground objects from the background clutter.

In another preferred method 20 applied to range estimation, step 22 displays several different illumination patterns and a dark screen. Thus, several difference images may be computed by combining the images acquired for each pattern with the images for the dark screen. Preferably four patterns (and a dark screen) are used resulting in four difference images being computed. The four patterns are chosen so that the four difference images are linearly independent, when considered as points in a vector space having one dimension per screen pixel. That is, one difference image can not be synthesized from a linear combination of the others.

The patterns are also chosen so that the differences between the images captured are as great as possible. This is accomplished by making the differences between the illumination patterns as great as possible. For example, as shown in FIGS. 3A–3D, dividing the screen into quadrants 32, 34, 36, and 38 and having one quadrant lit for each pattern gives a minimal difference between any pair of patterns of one half of the area of the screen, but only a difference of one quarter of the screen from the baseline pattern (a dark screen). If, for quadrants 42, 44, 46, and 48, three are lit and one is dark (the four patterns shown in FIGS. 4A–4D), any pair of those patterns will still have a difference of one half the screen size, but now the difference between each pattern and the baseline will increase from one quarter screen to three quarter screens. Given the small amount of light that is being measured, any increase is helpful. This configuration of patterns is not optimal. However, significant gains can only be made at a great increase of complexity of the patterns.

Steps 24, 26, and 28 are similar to those discussed above in relation to foreground/background segmentation. Step 24 may employ one of several methods to reduce noise in the input images. Step 26 subtracts the dark image from each of the pattern images on a pixel-by-pixel basis to create the difference images. Step 28 may apply filters to reduce noise introduced in step 26.

With the clean difference images resulting from step 28, step 30 performs several steps for each pixel of at least a portion of the difference images. First, an illumination that a surface would receive from the display device at a selected range is calculated for each of the four patterns. The range may be, for example, 1 to 50 inches at 1 inch intervals. Second, an orientation of a ray in the scene corresponding to a given pixel is determined. Then, for the selection of ranges, a surface at that range is hypothesized. Last, for each hypothesized surface, the surface orientation and albedo that best match the observed images (in a least squares sense) is determined (i.e., the value of the surface orientation and albedo that best matches the observed intensities is calculated). This can be cast in a standard matrix form and solved using established techniques. The hypothesized range with the lowest error is selected as the estimated range to the object. The surface normal and albedo corresponding to the selected range are returned.

Figure 5:
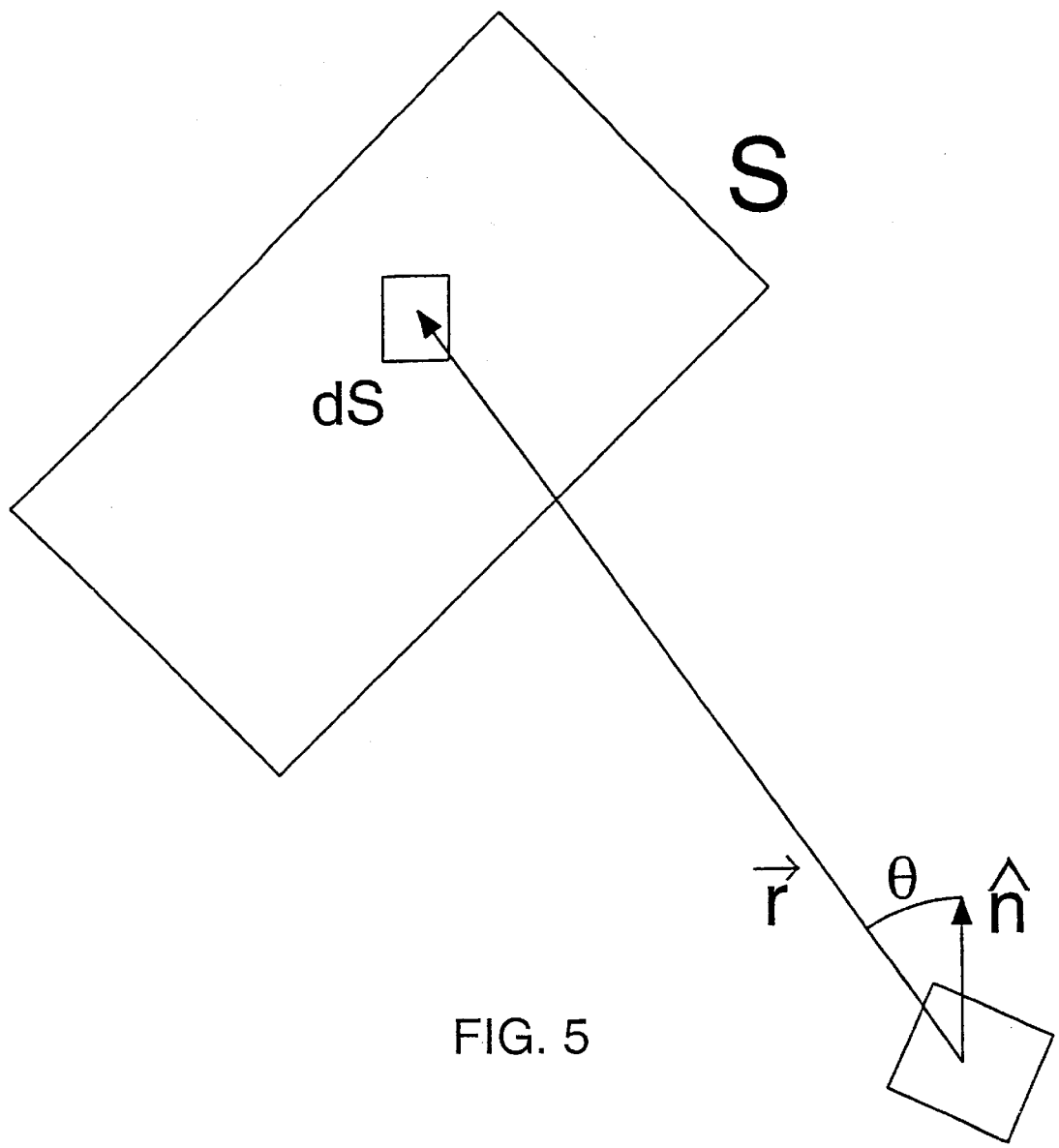
FIG. 5 is a schematic illustration of a pixel ray illuminating a surface.

More specifically, first, a calculation of what the illumination will be at any given point in space is made. This includes the intensity and the direction as shown in FIG. 5. A small piece of the illuminant dS illuminates a surface oriented with normal surface orientation n̂ at location $\vec{r}$ ($\vec{\cdot}$ indicates a vector and $\hat{\cdot}$ indicates a unit vector). By applying the Lambertian and Inverse-square assumptions (discussed below), the intensity of the reflected light is:

$$dI = \frac{I_0 \rho \cos\theta dS}{r^2}$$

$$= \frac{I_0 \rho \vec{r} \cdot \hat{n} dS}{r^3},$$

where r (range) is the length of the vector $\vec{r}$, $I_0$ is the intensity per pixel of the illuminant, θ is the angle that the vector $\vec{r}$ makes with the surface normal n̂, and ρ is albedo. To obtain the total illumination, the integral over the entire light emitting surface S is taken to get:

$$I = \int_s dI$$

$$= \int_s \frac{I_0 \rho \vec{r} \cdot \hat{n} dS}{r^3}$$

$$= \left( \int_s \frac{I_0 \vec{r} dS}{r^3} \right) \cdot (\rho \hat{n}),$$

where the first term is denoted as $\vec{I}$ (when using multiple patterns, these are denoted as $\vec{I}_1, \vec{I}_2, \ldots \vec{I}_N$) and the second term is denoted as $\vec{n}$ ($\vec{n}$ lies in the same direction as n̂, possibly with a non-unit length). Note that the expression for I has been decomposed into two parts: one that depends only on the illuminant and the other that depends only on the properties of the surface. In the case of a rectangular illuminant (i.e., a reasonable approximation to a computer monitor screen), the integrals can be expressed in a closed form; though not simple to express, these can be evaluated efficiently.

Figure 6:
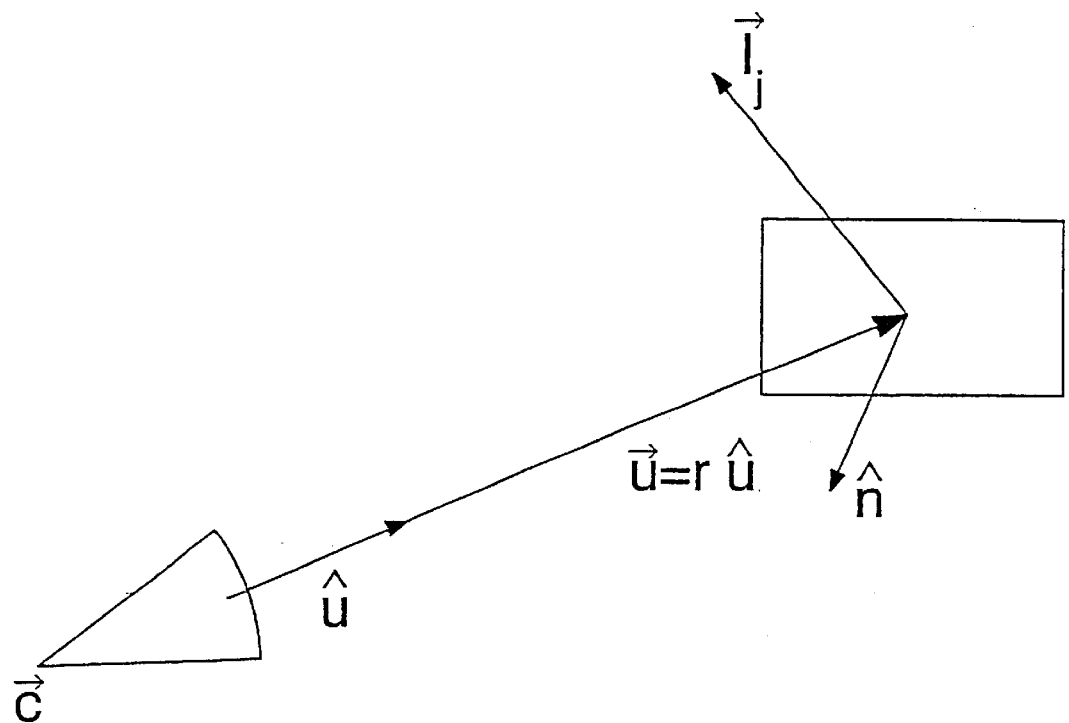
FIG. 6 is a schematic illustration of a pixel ray illuminating a point in space.

Referring to FIG. 6, $\vec{c}$ is the optical center of the camera, towards which the light is focused. To construct the depth map, the following measurements are taken and calculations are performed for each pixel in the camera's image. The ray û in the direction from which the pixel is gathering light is determined. At each of a selection of ranges, the illumination vectors $\vec{I}_i$ (that depend on the potential location of a surface at distance r in direction û having a location $\vec{c} + r\hat{u}$) for each of the illuminant patterns are calculated and the intensity of the pixel under that pattern is measured, denoting each intensity $I_1, I_2 \ldots I_N$. Ideally there should be a unique range r and a unique vector $\vec{n} = \rho \hat{n}$ that will satisfy:

$$I_j = \vec{I}_j \cdot \vec{n}, \ \forall_{j=1,2,\ldots N},$$

at range r. Each pattern provides one equation in three unknowns (the components of $\vec{n}$). With three (or fewer) patterns, the system is underdetermined (i.e., having at least one exact solution at any range) and provides no discriminatory ability for range estimation. Four or more patterns gives an overdetermined system (i.e., having no exact solution); however, the solution can be found with the least squared error:

$$\sum_{j=1}^{n} (I_j - \vec{I}_j \cdot \vec{n})^2.$$

The range and $\vec{n}$ with the least such error is used. The albedo ρ is the length of $\vec{n}$ and the direction is $\vec{n}$ $$\hat{n} = \frac{1}{\rho} \vec{n}.$$

Note that there is an ambiguity regarding ρ and $I_0$, but the measured intensity is unaffected by simultaneously multiplying ρ and dividing $I_0$ by the same factor. Given the difficulty of measuring the true value of $I_0$, it is acceptable to allow $I_0 = 1$ and regard the values of ρ to be relative values. If $I_0$ can be measured or an object of known albedo (e.g., ρ=1 for a perfectly white object) is placed in the scene, absolute values of ρ can be determined.

The following fundamental assumptions were made for the invention:

Inverse square law—Independent of anything else, the intensity of the light decreases inversely proportional to the square of the distance from its originating element.

Lambertian reflectivity—The observed intensity of light reflected off of an object is independent of the angle from which it is observed (assuming it is visible at all), is proportional to the cosine of the angle between the incoming light ray and the surface normal of the object and proportional to the albedo of the object (which is ideally dependent on the material of the object and not the shape).

Linear response from the camera—The values returned by the camera ideally would be directly proportional to the intensity of the light falling on each given pixel. However, this is not true at the ends of the scale where the value is constrained by the lower limit of 0 and the upper limit of 255. By using the middle of the camera's range, a reasonably linear response may be expected.

Monitor emission—It is assumed that each pixel of the monitor emits light in all directions (or at least in a hemisphere). For LCD screens or monitors with glare or privacy screens, a model of how the light spreads (e.g., in a cone, fading as moved away from normal to the screen) would be needed. Each pixel's light is assumed to be independent and to add linearly to other pixels. However, this may not be true in the case of very small amounts of pixels (i.e., when two adjacent pixels overlap slightly and give off less than twice the light of one). Since aggregates of tens to hundreds of thousands of pixels are used, essentially an average pixel intensity is used.

Calibration—The size and orientation of the monitor and the relative position and orientation of the camera need to be know.

Flat screen—A monitor is typically not flat, but the deviation is generally a few percent. If good measurements can be made, corrections could be made for the non-planarity. This is more of a computation simplification rather than an assumption.

Perspective camera—The camera must act as a perspective transformation. The light should act as if focused onto a single, optical center. The actual intensity readings are made in a flat plane (the focal plane) which does not pass through the optical center. The effect of this is that each pixel of the camera image gathers the light coming from a single direction, or more precisely, a small cone of directions. This cone is approximated with a single ray.

The flat screen and the isotropy of the monitor emissions assumptions could be relaxed if a good model of the actual light spread is given. Although this would be harder to incorporate than a curved monitor, there is no reason it could not be done in principle (specific shapes or functions have different levels of difficulty). Changing other assumptions will make radical changes in the difficulty of the problem. Using a flat screen and isotropic illumination makes most of the math solvable in closed form.

It will be understood by those skilled in the art that while the foregoing description sets forth in detail preferred embodiments of the present invention, modifications, additions, and changes may be made thereto without departing from the spirit and scope of the invention. Having thus described our invention with the detail and particularity required by the Patent Laws, what is desired to be protected by Letters Patent is set forth in the following claims.

We claim:

1. A method for analyzing surroundings of a computer monitor, comprising the steps of:
   directing the computer monitor towards the surroundings;
   causing the computer monitor to illuminate the surroundings with at least two different illumination patterns;
   capturing at least one image of the surroundings illuminated by each illumination pattern;
   combining the captured images to create at least one difference image; and
   performing calculations on the at least one difference image to interpret objects in the surroundings.

2. The method for analyzing the surroundings of a computer monitor according to claim 1, wherein:
   the computer monitor is connected to a computer having a processor;
   the illumination patterns are generated by the computer monitor under the control of the processor;
   the images are captured by a camera having an aperture directed generally towards the surroundings; and
   the camera is connected to the computer and controlled by the processor.

3. The method for analyzing the surroundings of a computer monitor according to claim 1, wherein the step of performing calculations includes:
   computing an intensity value for each pixel in the at least one difference image;
   computing a histogram of the intensity values;
   assigning a threshold value to the intensity value corresponding to the deepest local minimum in the histogram; and
   creating a binary mask by assigning a first binary value to any pixel that exceeds the threshold value and a second binary value otherwise.

4. The method for analyzing the surroundings of a computer monitor according to claim 1, wherein the at least two illumination patterns include a substantially completely bright pattern and a substantially completely dark pattern.

5. The method for analyzing the surroundings of a computer monitor according to claim 1, wherein the step of performing calculations includes:
   a) for each pixel in at least a portion of the at least one difference image:
      calculating an intensity of the pixel;
      calculating an illumination at predetermined surfaces in space, wherein each surface has a range, a surface orientation, and an albedo;
      comparing the intensity and the illumination; and
      selecting the surface having the illumination that best compares to the intensity of the pixel;
   and
   b) dividing the surroundings into at least one object based on the selected surface for each pixel in the at least one distance image.

6. The method for analyzing the surroundings of a computer monitor according to claim 1, wherein the computer monitor illuminates the surroundings with five illumination patterns including one illumination pattern where the computer monitor outputs no illumination and four patterns each having four quadrants where a different quadrant is not illuminated in each of the four patterns.

7. The method for analyzing the surroundings of a computer monitor according to claim 1, wherein:
   the step of the illuminating the surroundings with at least two different illumination patterns is repeated at least one time, and
   the step of combining the captured images to create at least one difference image comprises the steps of, for each pattern displayed:
      combining the images captured for that pattern to create a pattern image, and
      combining each pattern image to create the at least one difference image.

8. The method for analyzing the surroundings of a computer monitor according to claim 7, wherein the images captured for each pattern are combined by computing the mean.

9. The method for analyzing the surroundings of a computer monitor according to claim 7, wherein the images captured for each pattern are combined by computing the median.

10. The method for analyzing the surroundings of a computer monitor according to claim 7, wherein the images captured for each pattern are combined by computing the trimmed mean.

11. The method for analyzing the surroundings of a computer monitor according to claim 1, further including the steps of:
    filtering the at least one captured image; and
    filtering the difference image.

12. The method for analyzing the surroundings of a computer monitor according to claim 1, further including the steps of:
    interpreting the objects in the surroundings to identify user gestures; and
    controlling the computer based on the said gestures.

13. The method for analyzing the surroundings of a computer monitor according to claim 1, further including the steps of:
    interpreting the objects in the surroundings to identify a user; and
    controlling the computer based on the identity of the user.

14. An apparatus for analyzing surroundings of a computer, comprising:
    a processor within the computer;
    a computer monitor connected to the computer, wherein the processor causes the computer monitor to illuminate at least one object in front of the computer monitor with at least two different patterns; and
    a camera connected to the computer, wherein the camera is directed towards the at least one object in front of the computer monitor and the processor causes the camera to capture at least one image of the at least one object each time the at least one object is illuminated by one of the patterns;
    wherein the processor combines the images captured by the camera to create a difference image and performs calculations on the difference image to interpret objects in the surroundings.

15. The apparatus for analyzing the surroundings of a computer according to claim 14, wherein the calculations segment a foreground from a background of the surroundings by:

computing an intensity value for each pixel in the difference image;

computing a histogram of the intensity values;

assigning a threshold value to the intensity value corresponding to the deepest local minimum in the histogram; and creating a binary mask by assigning a first binary value to any pixel in the difference image that exceeds the threshold value and a second binary value otherwise.

16. The apparatus for analyzing the surroundings of a computer according to claim 14, wherein the calculations estimate a range for at least one object in the surroundings by:

a) creating a distance image for at least a portion of the difference image by, for each pixel in the at least a portion of the difference image:
calculating an intensity of the pixel;
calculating an illumination at predetermined surfaces in space, wherein each surface has a range, a surface orientation, and an albedo;
comparing the intensity and the illumination; and
selecting as the range estimation of the pixel the range, surface orientation, and albedo of the surface having the illumination that best compares to the intensity of the pixel; and dividing the surroundings into at least one object based on the range estimations for each pixel in the distance image.

17. A method for analyzing surroundings of a computer monitor, comprising the steps of:

directing the computer monitor towards the surroundings;

displaying a first pattern on the computer monitor thereby illuminating the surroundings with a first illumination pattern;

displaying a second, different pattern on the computer monitor thereby illuminating the surroundings with a second illumination pattern;

capturing at least one image of the surroundings illuminated by each illumination pattern;

combining the captured images to create a difference image; and performing calculations on the difference image to segment a foreground from a background of the surroundings.

18. The method for analyzing surroundings of a computer monitor according to claim 17, wherein the calculations include:

computing an intensity value for each pixel in the difference image;

computing a histogram of the intensity values;

assigning a threshold value to the intensity value corresponding to the deepest local minimum in the histogram; and creating a binary mask by assigning a first binary value to any pixel in the difference image that exceeds the threshold value and a second binary value otherwise.

19. A method for analyzing surroundings of a computer monitor, comprising the steps of:

causing the computer monitor to illuminate the surroundings with five different illumination patterns;

capturing at least one image of the surroundings illuminated by each illumination pattern;

combining the captured images to create at least one difference image; and performing calculations on the at least one difference image to determine a range estimation for at least one object in the surroundings.

20. The method for analyzing surroundings of a computer monitor according to claim 19, wherein the calculations include the steps of:

a) for each pixel in the at least a portion of the at least one difference image, creating a distance image for at least a portion of the at least one difference image by:
calculating an intensity of the pixel;
calculating an illumination at predetermined surfaces in space, wherein each surface has a range, a surface orientation, and an albedo;
comparing the intensity and the illumination; and
selecting as the range estimation of the pixel the range, surface orientation, and albedo of the surface having the illumination that best compares to the intensity of the pixel; and b) dividing the surroundings into at least one object based on the range estimations for each pixel in the distance image.

\* \* \* \* \*

UNITED STATES PATENT AND TRADEMARK OFFICE
CERTIFICATE OF CORRECTION

PATENT NO. : 6,704,447 B2
DATED : March 9, 2004
INVENTOR(S) : Sukthankar et al.

It is certified that error appears in the above-identified patent and that said Letters Patent is hereby corrected as shown below:

Column 11,
Line 31, "dividing the" should read -- b) dividing the --.

Signed and Sealed this

Third Day of August, 2004

JON W. DUDAS
*Acting Director of the United States Patent and Trademark Office*